United States Patent [19]

Armellino, Jr. et al.

[11] Patent Number: 4,522,871
[45] Date of Patent: Jun. 11, 1985

[54] BALLISTIC MATERIAL FOR FLEXIBLE BODY ARMOR AND THE LIKE

[76] Inventors: Richard A. Armellino, Jr., 30 Barkers La., Huntington Station, N.Y. 11746; Stephen E. Armellino, 27 Florence Point Dr., Fernandina Beach, Fla. 32034

[21] Appl. No.: 482,414

[22] Filed: Apr. 6, 1983

Related U.S. Application Data

[63] Continuation of Ser. No. 260,329, May 4, 1981, abandoned.

[51] Int. Cl.³ .................... B32B 5/00; B32B 27/00; F41H 5/08
[52] U.S. Cl. .................................. 428/252; 2/2.5; 428/287; 428/300; 428/301; 428/302; 428/911
[58] Field of Search ............... 2/2.5; 428/252, 911, 428/284, 286, 287, 300, 301, 302

[56] References Cited

U.S. PATENT DOCUMENTS

| 3,018,210 | 1/1962 | Frieder et al. | 2/2.5 |
| 3,320,619 | 5/1967 | Lastnik et al. | 2/2.5 |
| 3,958,276 | 5/1976 | Clausen | 2/2.5 |
| 4,079,464 | 3/1978 | Roggin | 428/911 X |
| 4,090,005 | 5/1978 | Morgan | 428/252 X |

Primary Examiner—Lorraine T. Kendell
Attorney, Agent, or Firm—William P. Keegan

[57] ABSTRACT

Improved ballistic material comprising a multiplicity of plies of ballistic cloth woven with an aramid, e.g., Kevlar, thread, one or more of which plies are treated with resorcinol formaldehyde latex to coat the aramid threads and fill the interstices between the threads of a treated ply.

12 Claims, 5 Drawing Figures

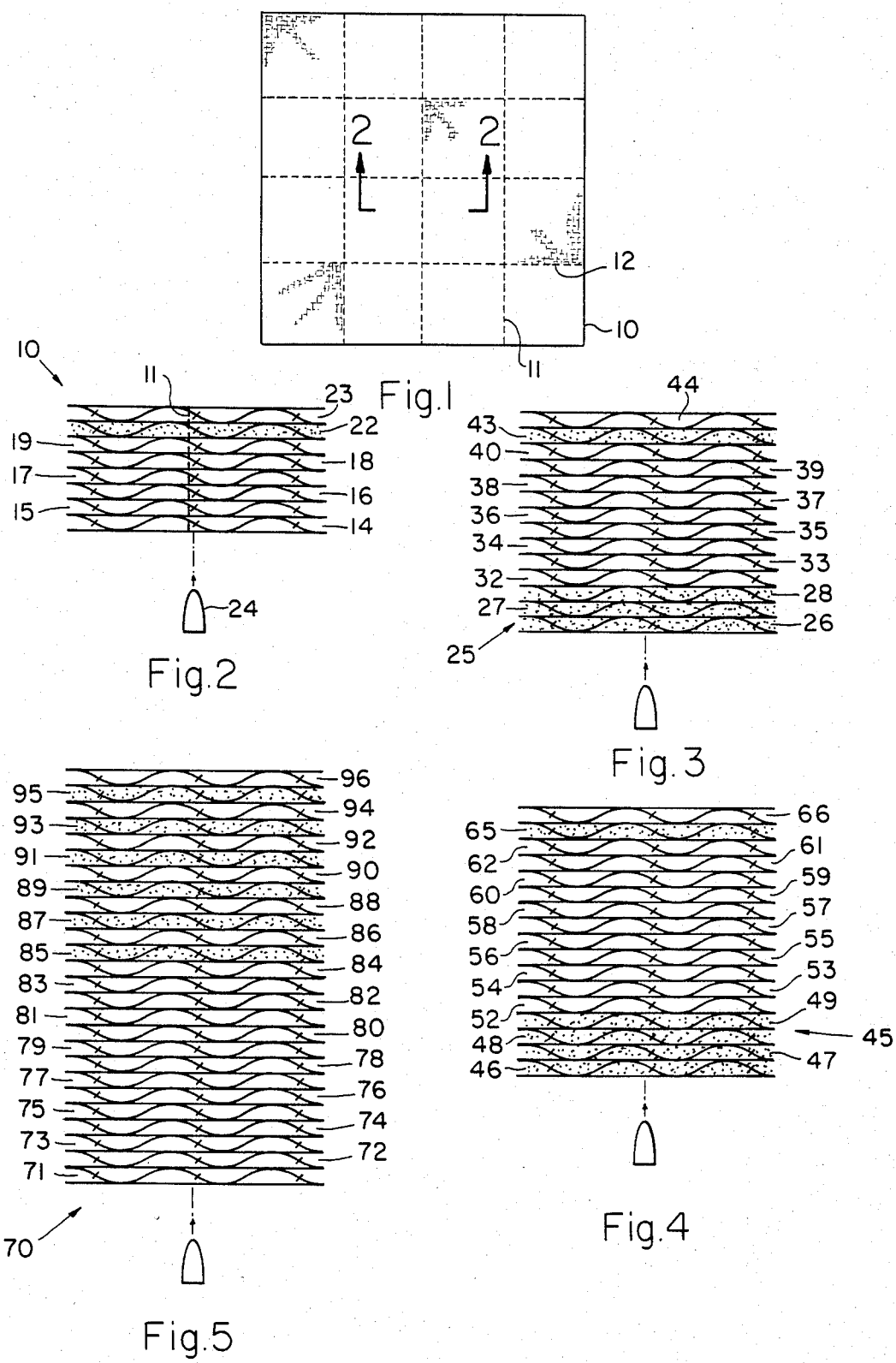

BALLISTIC MATERIAL FOR FLEXIBLE BODY ARMOR AND THE LIKE

This is a continuation of application Ser. No. 260,329 filed May 4, 1981, and now abandoned.

BACKGROUND OF THE INVENTION

The use of ballistic fabrics to provide flexible body armor, e.g., a bullet resistant garment or vest, that is resistant to penetration by projectiles such as bullets, shrapnel, flak, or the like, or other weapons is known in the prior art. See, for example, U.S. Pat. Nos. 3,891,996, 3,988,780, and 4,079,464. Moreover, it is known to provide different vests to meet different threats or weapons. Thus, a lighter weight vest will be provided to resist projectiles fired from weapons of lesser firepower. By lighter weight is generally meant that the vest will comprise fewer layers of ballistic cloth. If it is desired to provide a vest capable of resisting penetration by a projectile from a higher powered weapon, additional layers of ballistic cloth will be used in the vest. In this way, vests capable of resisting penetration by projectiles from even the most highly powered weapons can be tailored to different weapons. But, when the ballistic capabilities of vests are improved in this manner it is at the cost of making the vests more bulky and unwieldy. Ballistic capabilities may be improved by providing a metal plate between layers of ballistic cloth or by closely stitching the cloth layers together. Here the trade off is a vest that is less flexible and more uncomfortable to wear.

It is clear that increasing the ballistic capability of a bullet resistant vest by making it more bulky or less flexible is not a satisfactory solution, particularly when, for example, in the case of police officers, the vest should be worn over protracted periods of time. If the vest is uncomfortable to wear for long periods there will be a tendency not to wear them continuously, but only at times of perceived danger. Obviously, this is a condition to be avoided since a user can never be certain of the moment of danger. The dangerous situation might arise spontaneously and unexpectedly, and the user ought to be prepared and protected at all times.

SUMMARY OF THE INVENTION

This invention relates to body armor, and more particularly to flexible body armor embodying a plurality of layers of ballistic cloth, one or more of which layers is treated with an adhesive material. More generally, the invention relates to the ballistic material from which the body armor is manufactured.

It is the object of the present invention to provide an improved ballistic material and improved body armor.

It is another object of the invention to provide improved body armor that is lighter in weight than existing body armor having equivalent ballistic capabilities.

It is still another object of the invention to provide improved body armor that is thinner than existing body armor having equivalent ballistic capabilities.

Yet another object of the invention is to provide body armor that is comfortable to wear for long periods of time and has high ballistic capabilities.

Another object of the invention is to provide body armor having a high ballistic capability and which is trimmer and smoother in appearance so that it can be worn inconspicuously.

It is another object of the invention to provide body armor of high ballistic capability that is more shape retentive than existing body armor having comparable ballistic capabilities.

In carrying out the invention there is provided a multi-ply ballistic fabric comprising a plurality of plies woven of aramid fibers, such as Kevlar, and at least one ply woven of aramid fibers and impregnated with resorcinol formaldehyde latex which material coats the fibers and fills the interstices of the ply without adversely affecting the flexability of the ply. The various plies of fabric may be sewn together by using an aramid fiber thread and lock stitching the fabric along parallel stitch paths that are relatively widely spaced. Additional stitch paths may run transversely to the aforesaid stitches.

Features and advantages of the invention may be gained from the foregoing and from the description of the preferred embodiment of the invention which follows.

BRIEF DESCRIPTION OF THE DRAWING

FIG. 1 is a front elevational view of a segment of body armor according to the present invention;

FIG. 2 is an enlarged sectional view taken along line 2—2 of FIG. 1;

FIG. 3 is a sectional view similar to FIG. 2 but illustrating body armor having a greater ballistic capability than the body armor shown in FIG. 2;

FIG. 4 is a sectional view similar to FIG. 2 but illustrating body armor having a still greater ballistic capability than the body armor shown in FIG. 3; and FIG. 5 is a sectional view similar to FIG. 2 but illustrating body armor having a still greater ballistic capability than the body armor shown in FIG. 4.

DETAILED DESCRIPTION OF THE INVENTION

Referring to FIG. 1, a fragment of the ballistic material made in accordance with the present invention is shown by the reference numeral 10. The material, or more specifically fabric, may be lock stitched with longitudinal rows of stitching 11 and cross stitching 12. The rows of stitching need not be closely spaced, and, in fact, are preferably widely spaced, e.g., about 1½ to 3 or more inches between rows, so as not to lessen the flexibility of the fabric. If the fabric is cut to be made into a vest or other body garment, the stitching may not be coextensive with the entire garment, but rather may be provided only in localized areas where any lessening of the flexibility of the garment would not adversely affect the comfort of the wearer of the garment. The thread used for the stitching will preferably be of the same material used in weaving the cloth of the ballistic material 10. A benefit of the stitching will be referred to hereinafter.

Turning to FIG. 2, ballistic fabric 10 is seen to comprise at least several plies of cloth. Plies 14, 15, 16, 17, 18, and 19 are woven of ballistic fibers, preferably an aramid fiber such as E. I. DuPont de Nemour's Kevlar fiber. The fabric of plies 14 to 19 is plain woven with 1000 denier thread at a density of thirty one by thirty one threads per inch. Ply 22 is also woven of a ballistic fiber, again preferably an aramid fiber, but this ply is treated or impregnated with resorcinol formaldehyde latex to coat the threads of the ply and fill the interstices between the threads and thus provide a flexible bond between the threads. Ply 22 is a two by two basket weave woven with 1500 denier thread at a density of thirty four by thirty five threads per inch. Ply 23 is the same as plies 14 to 19. As shown, ply 14 forms the outer or strike surface of fabric 10 that would first be struck by a projectile or missile such as bullet 24.

A ballistic fabric manufactured according to the foregoing specification and fabricated as shown in FIG. 2 has been found effective in stopping bullets from the following weapons: .22 L.R.H.V. 4 inch barrel; .25 Automatic; .32 Automatic; .38 Special+P,4 inch barrel; .380 Automatic; .44 Special; .45 Automatic; and 12 GA/00 buckshot.

To stop a higher energy missile such as might be fired by the following weapons: .22 Magnum, 6 inch barrel; .38 Super; .357 Magnum J.S.P., J.H.P., 4 inch barrel; 9 mm. (U.S.A. manufacture), 5 inch barrel; and .44 Magnum Remington 240 gr. J.S.P., 4 inch barrel, a fabric 25 such as shown in FIG. 3 would be preferred. In this fabric, plies 26, 27, 28, and 43 are similar to ply 22 in fabric 10, and plies 32, 33, 34, 35, 36, 37, 38, 39, 40, and 44 are similar to plies 14 to 19 in fabric 10.

Still higher energy missiles such as might be fired by the following weapons: .357 Magnum Remington 125 gr. J.H.P., 6 inch barrel; .357 Magnum Remington 158 gr. J.S.P., 8 inch barrel; 9 mm. Sub-Machinegun Remington 124 gr. FMC, 8 inch barrel; and .44 Magnum Remington 240 gr. J.S.P., 6½ inch barrel, will be stopped by the fabric 45 illustrated in FIG. 4. Here plies 46, 47, 48, 49, and 65 are similar to ply 22 in fabric 10 and plies 52, 53, 54, 55, 56, 57, 58, 59, 60, 61, 62, and 66 are similar to plies 14 to 19 in fabric 10.

A ballistic fabric 70 that is suitable for body armor for special purpose tactical units whose members probably would wear the body armor only when engaged in high risk assignments is shown in FIG. 5. In this fabric, ply 71 is plain woven of 1000 denier Kevlar aramid thread at a density of thirty one by thirty one threads per inch. Plies 72, 73, 74, 75, 76, 77, 78, 79, 80, 81, 82, 83, and 84 are plain woven of 1000 denier Kevlar aramid thread at a density of seventeen by seventeen threads per inch. Plies 85, 87, 89, 91, 93, and 95 are plain woven of 1000 denier Kevlar aramid thread at a density of seventeen by seventeen threads per inch, and each ply is treated or impregnated with resorcinol formaldehyde latex to coat the threads of each ply and fill the interstices between the threads to provide a flexible bond between the threads of a ply. Plies 86, 88, 90, 92, and 94 are similar to plies 72 to 84, and ply 96 is similar to ply 71. Fabric 70 can defeat missiles fired by the following weapons: .357 Magnum Remington 125 gr. J.H.P., 8 inch barrel; 9 mm. Sub-Machinegun Remington 124 gr. FMC, 10 inch barrel; .44 Magnum Remington 240 gr. J.S.P. 7½ inch barrel; and 12/GA Rifled Slug Braneke 2⅜ inch, 20 inch barrel.

It should be observed that FIGS. 2, 3, 4, and 5 are shown greatly enlarged. The actual thicknesses of the ballistic fabrics illustrated are approximately 3/16 of an inch, 5/16 of an inch, 7/16 of an inch, and 9/16 of an inch, respectively, when provided in accordance with the teaching of the present specification.

The ballistic capability of all of the fabrics disclosed can be increased by introducing a metal plate between the plies of the fabric.

The effectiveness or efficiency of ballistic fabrics is measured by a testing procedure that accords a merit factor to the fabric. Thus, a sample of the fabric under test is subjected to a series of missiles. The test technician increases the missile speed until a complete penetration of the fabric is achieved. Additional missiles are fired at the fabric at speeds above and below that at which complete penetration of the fabric occurred. The lowest speed at which complete penetration of the fabric occurred and the highest speed at which a partial penetration occurred are averaged, and this average speed is designated V/50. When the V/50 value for a fabric is divided by the area density of the fabric, or more specifically, the ounces per square foot of the fabric, the ballistic merit factor for the fabric is obtained. It is clear that if different fabrics test out to the same V/50, the lighter weight fabric will have the higher ballistic merit factor.

Thus, a fabric having a higher ballistic merit factor than a second fabric will produce a lighter weight vest, or other garment or product, but the lighter weight vest will have the same protective value as the second fabric. The advantages of a fabric having a higher ballistic merit factor are self evident. Tests conducted in civilian and U.S. Government test laboratories have shown that fabrics made in accordance with the present invention have a ballistic merit factor 18% to 25% higher than ballistic fabrics heretofore available.

The tests that are conducted to ascertain the effectiveness of ballistic fabrics follow the normal practice of firing missiles directly at the fabric. That is, the missile is fired at the test sample with less than five degree offset from the normal to the fabric surface since it is the general belief that the straight-in shot is most damaging. However, it has been observed that some missiles, e.g., a copper jacketed hard nosed bullet, penetrates a greater distance into a fabric when fired obliquely at its surface than when fired directly, or normally, to the fabric surface. Apparently, the obliquely fired missile picks its way through the fabric. Stitching the fabric plies together, as by stitchings 11 and 12, minimizes oblique penetration of the fabric.

In the description, body armor generally was referred to as vests. Of course, other garments could be constructed of the ballistic material disclosed. Also, the ballistic material could be used to provide bullet resistant curtains, or draperies, or could be used as wall coverings or wall liners to provide bullet resistant walls or partitions, or the like. In fact, the disclosed material could be used for any missile or weapon resistant application.

Having thus described the invention, it is clear that what may appear to be different embodiments could be provided without departing from the spirit and scope of the invention. For example, fabrics with different numbers of plies could be made; or the plies could be assembled in a different order. Different weaves of cloth could be used or different denier thread. The density of the weave in different plies could be varied. Hence, it is intended that the foregoing specification and the drawing be interpreted as illustrative rather than in a limiting sense.

What is claimed is:

1. A ballistic material suitable for use in flexible body armor, wall coverings and liners, curtains and draperies, said material comprising, from the outer protective side to the inner side of said material, at least three plies of ballistic cloth woven of aramid fibers and each individually impregnated with resorcinol formaldehyde latex means, at least nine plies of non-impregnated ballistic cloth woven of aramid fibers, and a ply of ballistic cloth woven of aramid fibers and impregnated with resorcinol formaldehyde latex means.

2. A ballistic material according to claim 1 in which the impregnated and non-impregnated plies are stitched together to minimize oblique penetration of the material by a missile.

3. A ballistic material according to claim 1 wherein the non-impregnated plies are woven of 1000 denier fiber and the impregnated plies are woven of 1500 denier fiber.

4. A ballistic material according to claim 3 wherein the 1000 denier plies are plain woven and have a warp and a weft of approximately thirty one threads per inch and the 1500 denier plies are woven in a two by two basketweave and have a warp and a weft of approximately thirty four threads per inch.

5. A ballistic material according to claim 4 including, on the inner side of said material, a non-impregnated ply of 1000 denier plain woven cloth having a warp and a weft of approximately thirty one threads per inch.

6. A ballistic material according to claim 4 wherein the impregnated and the non-impregnated plies are stitched together to minimize oblique penetration of the material by a missile.

7. A ballistic material suitable for use in flexible body armor, wall coverings and liners, curtains and draperies, said material comprising, from the outer protective side to the inner side of said material, at least four plies of ballistic cloth woven of aramid fibers and each individually impregnated with resorcinol formaldehyde latex means, at least eleven plies of non-impregnated ballistic cloth woven of aramid fibers, and a ply of ballistic cloth woven of aramid fibers and impregnated with resorcinol formaldehyde latex means.

8. A ballistic material according to claim 7 in which the impregnated and non-impregnated plies are stitched together to minimize oblique penetration of the material by a missile.

9. A ballistic material according to claim 7 wherein the non-impregnated plies are woven of 1000 denier fiber and the impregnated plies are woven of 1500 denier fiber.

10. A ballistic material according to claim 9 wherein the 1000 denier plies are plain woven and have a warp and a weft of approximately thirty one threads per inch and the 1500 denier plies are woven in a two by two basketweave and have a warp and a weft of approximately thirty four threads per inch.

11. A ballistic material according to claim 10 including, on the inner side of said material, a non-impregnated ply of 1000 denier plain woven cloth having a warp and a weft of approximately thirty one threads per inch.

12. A ballistic material according to claim 10 wherein the impregnated and the non-impregnated plies are stitched together to minimize oblique penetration of the material by a missile.

* * * * *